(12) United States Patent
Hayee et al.

(10) Patent No.: US 7,747,172 B2
(45) Date of Patent: Jun. 29, 2010

(54) OPTICAL COMMUNICATION SYSTEM HAVING ENHANCED SPECTRAL EFFICIENCY USING ELECTRONIC SIGNAL PROCESSING

(76) Inventors: M. Imran Hayee, 514 Valley Dr., Duluth, MN (US) 55804; Rami J. Haddad, 2033 Annetta Ave., Akron, OH (US) 44313

( * ) Notice: Subject to any disclaimer, the term of this patent is extended or adjusted under 35 U.S.C. 154(b) by 529 days.

(21) Appl. No.: 11/800,095

(22) Filed: May 4, 2007

(65) Prior Publication Data

US 2007/0274628 A1 Nov. 29, 2007

Related U.S. Application Data

(60) Provisional application No. 60/799,244, filed on May 10, 2006.

(51) Int. Cl.
*H04B 10/00* (2006.01)
*H04B 10/08* (2006.01)
*H04B 10/12* (2006.01)

(52) U.S. Cl. .......................... 398/149; 398/25; 398/26; 398/27; 398/159; 398/193

(58) Field of Classification Search .................. 398/25, 398/26, 147, 149, 158, 159, 192–194, 199, 398/27
See application file for complete search history.

(56) References Cited

U.S. PATENT DOCUMENTS

| 6,961,373 | B2* | 11/2005 | Jones | 375/232 |
|---|---|---|---|---|
| 7,471,904 | B2* | 12/2008 | Kaneda et al. | 398/208 |
| 2005/0058461 | A1* | 3/2005 | Lee et al. | 398/198 |
| 2006/0034618 | A1* | 2/2006 | Chen et al. | 398/198 |
| 2007/0222654 | A1* | 9/2007 | Vrazel et al. | 341/144 |

OTHER PUBLICATIONS

Hayee, M. I., et al., "Enhancing spectral efficiency of binary NRZ optical networks with electronic signal processing," vol. 5, No. 9, Sep. 2006, Journal of Optical Network, pp. 655-661.

Haddad, R., et al., "Spectral Efficiency of up to 1.6 bit/sec/Hz in Binary NRZ WDM Systems using Electronic Signal Processing," Optical Society of America, 2005, pp. 1-2.

* cited by examiner

*Primary Examiner*—Dalzid Singh
(74) *Attorney, Agent, or Firm*—Potomac Patent Group PLLC

(57) ABSTRACT

An optical communication system combines strong electrical pre-filtering of data at the transmitter and digital feedback equalization (DFE) at the receiver to enhance spectral efficiency. The system can be applied to optical networking and digital communication systems, including binary modulated systems optical network systems.

30 Claims, 4 Drawing Sheets

OPTICAL COMMUNICATION SYSTEM HAVING ENHANCED SPECTRAL EFFICIENCY USING ELECTRONIC SIGNAL PROCESSING

RELATED APPLICATIONS

This application claims priority to U.S. Patent Application No. 60/799,244, filed May 10, 2006, the disclosure of which is hereby incorporated by reference.

TECHNICAL FIELD

The invention relates to fiber optic communications and optical communication systems, such as metropolitan optical networks or the like.

BACKGROUND

Fiber optic communication generally involves modulating optical signals at high bit rates and transmitting the modulated optical signals over optical fibers. For example, in a wavelength division multiplexed (WDM) fiber optic communications system, optical carrier signals at a sequence of distinct wavelengths are separately modulated by information channels and then multiplexed onto a single optical fiber. Efforts continue toward increasing the data capacity of fiber optic communications systems.

One of the key features of a wavelength division multiplexed (WDM) system is spectral efficiency, which determines how many bits/sec of data can be transmitted per unit of available bandwidth. The available bandwidth in practical WDM systems is limited by optical amplifiers which are used to periodically boost the optical power for a given transmission length. However, upgrading the capacity of existing optical networks by replacing in-ground fiber and amplifiers is extremely costly. Various techniques have been proposed to enhance the spectral efficiency of WDM systems to improve spectral efficiency (i.e., bits per second transmitted per unit of available bandwidth) of the existing optical infrastructure. That is, because of the cost associated with upgrading or replacing the available WDM bandwidth, various techniques have been proposed to enhance the spectral efficiency of WDM systems to approach or exceed 1 bit/sec/Hz, which is the theoretical limit for a simple binary modulation format.

However, most of these techniques involve either complex binary modulation formats to limit the channel bandwidth for a given data rate, or an attempt to take advantage of multi-level modulation formats and polarization division multiplexing to increase the spectral efficiency. However, many of these complex techniques require costly transmitters and receivers with specialized, expensive electronics.

SUMMARY

In general, techniques are described herein for combining strong electrical pre-filtering of data at a transmitter with digital feedback equalization (DFE) at a receiver to enhance the spectral efficiency of fiber optic communication. The techniques can be applied to optical networking and digital communication systems, including binary NRZ intensity modulated systems optical network systems.

In certain embodiments, pre-filtering of each data channel at the transmitter is accomplished using an electrical low pass filter (LPF) before optical intensity modulation in order to limit the channel bandwidth. That is, in order to limit the frequency spreading of the data channels, each data channel is pre-filtered prior to any modulation and multiplexing of the data channels into the fiber link. This pre-filtering effectively "clips" the frequency spreading of each of the data channels in the frequency domain, and allows for reduced channel spacing at the transmitter. As a result, the data channels can be "packed" closer within the frequency spectrum, thereby enhancing spectral efficiency of the optical transmission.

However, the incorporation of the pre-filtering at the transmitter induces severe inter-symbol interference (ISI) in each WDM channel. Therefore, DFE is employed at the receiver to electronically compensate for the ISI that was induced by strong pre-filtering of individual channels at the transmitter. In other words, DFE within the receiver is used to compensate for signal distortion that was intentionally introduced at the transmitter prior to optical transmission in order to reduce channel spacing, as opposed to compensation for ISI or other effects introduced by transmission through the optical channel. In this manner, pre-filtering at the transmitter and equalization at the receiver may be utilized in combination so as to enhance the spectral efficiency of a WDM system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
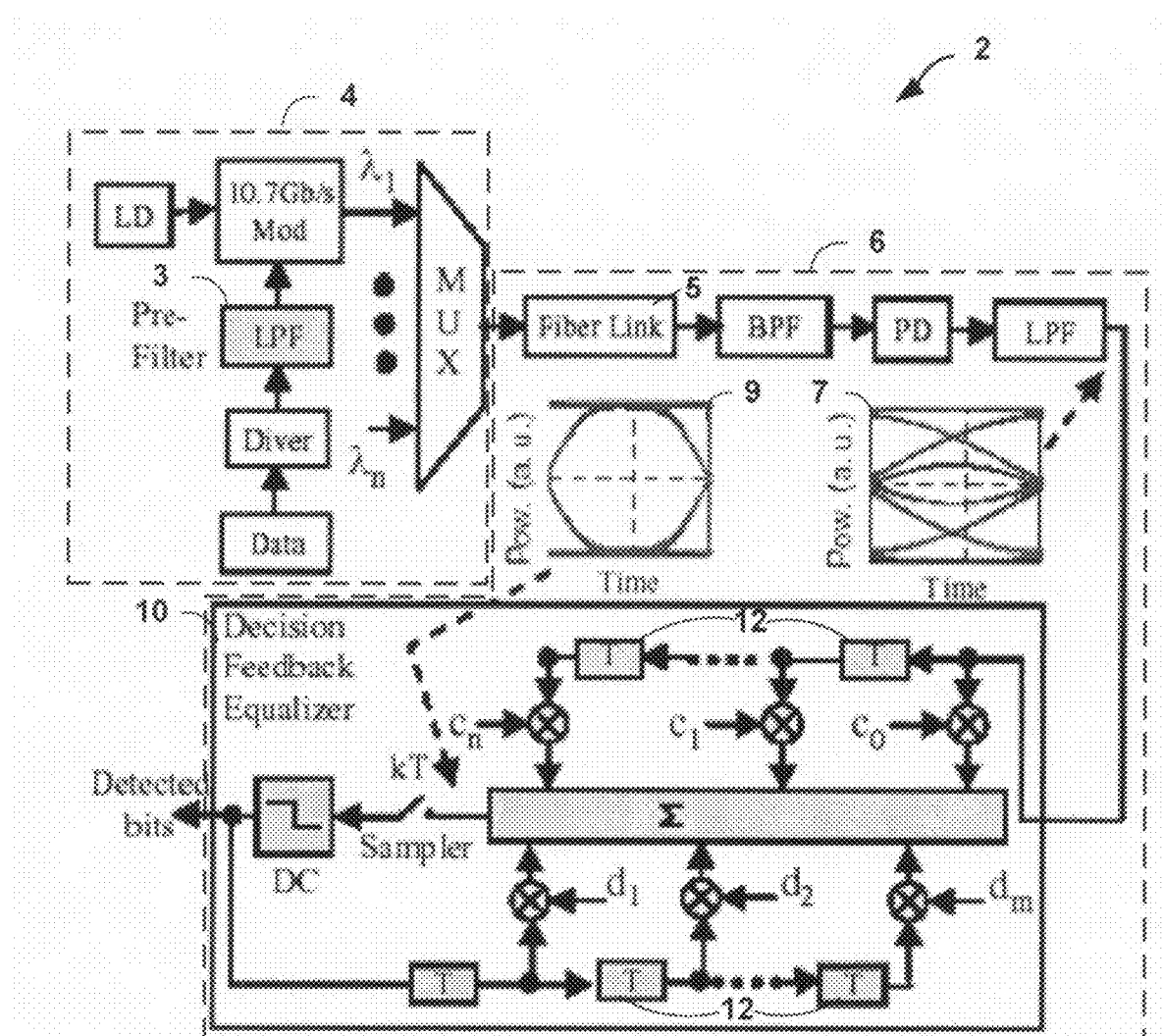
FIG. 1 is a schematic diagram of the WDM system employing pre-filter at transmitter and decision feedback equalizer at receiver. LD is a laser diode, PD is a photo-detector, DC is a decision circuit and T is a bit time delay. Please note that $\lambda_1$ to $\lambda_n$ are at orthogonal polarizations.

FIG. 1 is a block diagram of an example communication system 2 employing the electronic signal processing techniques to enhance spectral efficiency. At the transmitter 4, a filter 3, e.g., an electrical low pass filter (LPF), is used to pre-filter each data channel (data) by limiting the bandwidth of each data channel prior to modulation. In one embodiment, a Bessel shaped LPF of order 10 is used for pre-filtering. The 3-dB bandwidth of the pre-filter may be selected to reduce or minimize the crosstalk for a given channel spacing. The desired 3-dB bandwidth of the pre-filter may be 3.5 GHz for a spectral efficiency of 1 bit/sec/Hz (channel spacing=10 GHz). After pre-filtering, each data channel is optically modulated by a modulator (Mod), such as a Mach-Zehnder Interferometer (MZI) based modulator or other form of modulator suitable for optical communication. All the modulated channels are then multiplexed (MUX) together for transmission into the fiber link 5.

As one example, in one embodiment, 11 channels may be multiplexed with orthogonal polarizations of alternate wavelengths at the data rate of 10.7 Gb/s each to have an effective spectral efficiency of 1 bit/sec/Hz. A 10.7 Gb/s data rate can be used to include 7% forward error correction (FEC) overhead. To evaluate the effectiveness of the technique in back-to-back configuration, receiver 6 includes a bandpass filter (BPF) to demultiplex the middle of 11 simulated channels (FIG. 1). As one example, a $2^{nd}$ order Gaussian shaped bandpass filter (BPF) may be used with 3-dB bandwidth of 11 GHz, which can be tuned to limit the crosstalk for 10 GHz channel spacing with orthogonally launched adjacent channels.

After BPF, the optical signal is photo-detected (PD) and passed through an electrical LPF, e.g., an LPF with 3-dB bandwidth of 7.5 GHz. FIG. 1 shows one example in which, after LPF, an eye diagram 7 of the middle channel, where the eye diagram is a graph that superimposes data bits received versus time. Severe ISI induced by pre-filtering can be seen in eye diagram 7, which is due to distortion (i.e., ISI) introduced by the intentional pre-filtering of each data channel by filter 3. In the example of FIG. 1, Receiver 6 includes a decision feedback equalizer (DFE) 10 comprising n feed forward (FF) and m feedback (FB) tapped delay filters 12 to compensate for the ISI introduced by filter 3. Bit synchronous tapped delay filters i.e., the delay is one bit time (T), may be used. Other equalizers could be used, e.g., Maximum Sequence Likelihood Estimation (MSLE) or Viterbi Decoding, to compensate for the ISI resulting from the intentional pre-filtering at the transmitter 4.

In one embodiment, the coefficients ($d_1 \ldots d_m, c_0 \ldots c_n$) may be adaptive. For example, the coefficients ($d_1 \ldots d_m, c_0 \ldots c_n$) of FF and FB tapped delay filters may be adapted by sending a long sequence of randomly generated bits and using the least mean square (LMS) algorithm until the coefficients become stationary. The weights of the coefficients can be represented by a vector $\vec{C} = [c_0, c_1, \ldots, c_n, d_1, d_2, \ldots d_m]$. The LMS algorithm updates $\vec{C}$ with each incoming bit:

$$\vec{C}^{(k+1)} = \vec{C}^{(k+1)} + \Delta_k \vec{V}^{(k)} \quad (1),$$

where $\vec{C}^{(k)}$ represents the tap vector weights at time kT, $\Delta$ is the scale factor that controls the rate of adaptation and $\epsilon_k$ is the error signal between the decision sample and the decision output. The vector $\vec{V} = [v_k, v_{k-1}, \ldots, c_{k-(n-n)}, I_{k-1}, d_{k-2}, \ldots, d_{k-m}]$, where $v_{k-i}$ is the input signal at time (k−i)T and $I_{k-i}$ is the decision made at time (k−i)T.

Alternatively, since DFE 10 is being used to compensate for a known, intentional level of signal distortion resulting from filter 3 of transmitter 4, the coefficients ($d_1 \ldots d_m, c_0 \ldots c_n$) may be pre-computed, thereby conversing computation resources and reducing complexity of receiver 6. That is, coefficients ($d_1 \ldots d_m, c_0 \ldots c_n$) need not be adaptive based on an error signal, but rather set as a function of the amount of distortion that was intentionally introduced at the transmitter in order to tightly pack the data channels within the optical transmission. These stationary coefficients in DFE 10 of receiver 6 (as shown in FIG. 1) can be used to equalize the ISI induced by the pre-filtering of the channels at transmitter 4.

In the example of FIG. 1, a different sequence of $2^{13}$ pseudorandom bits can be used to obtain an eye diagram 9 just before the sampler for the decision circuit (part of the DFE). Eye diagram 9 of the middle channel is also shown in FIG. 1 (left of the two) using 8 FF and 2 FB tapped delay filters. More than 90% eye opening, as shown in eye diagram 9, shows that ISI induced by pre-filtering can be very efficiently compensated, proving the effectiveness of the technique of combining pre-filtering at transmitter and DFE at the receiver to enhance the spectral efficiency binary intensity modulated systems.

Figure 2:
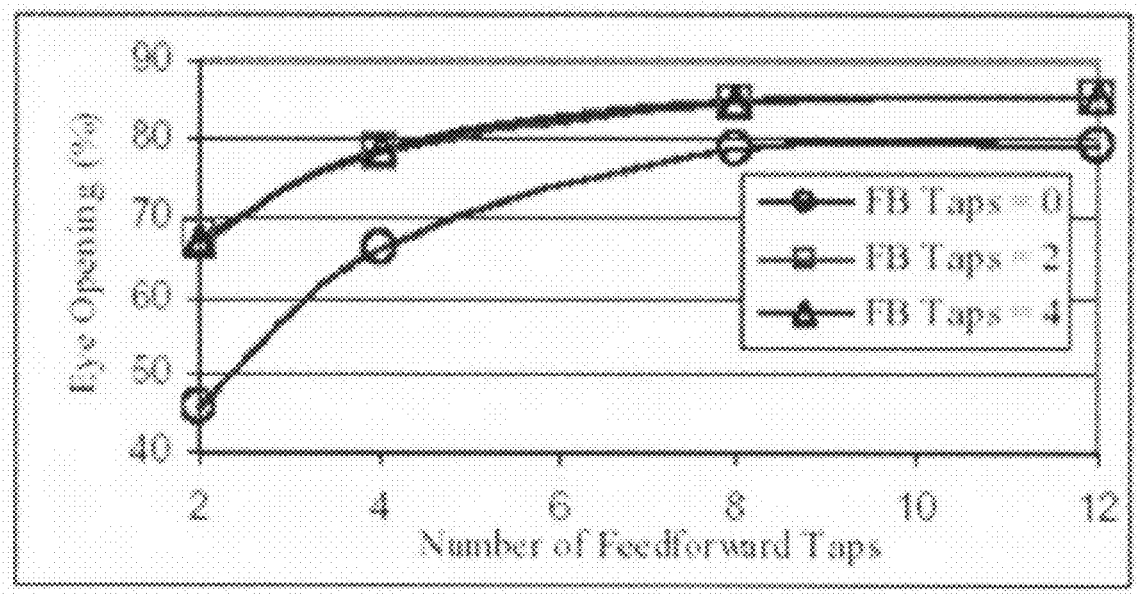
FIG. 2 is a graph showing the eye opening vs. number of feed forward tap filters for different numbers of feedback tap filters. Spectral efficiency is 1 bit/sec/Hz.

In the example of FIG. 1, the eye diagram 9 of FIG. 1 can be produced using 8 FF and 2 FB tapped delay filters. FIG. 2 illustrates example criteria for choosing a desirable number of FF and FB tapped delay filters for DFE 10 in which eye opening of 10 GHz spaced system is shown versus number of FF tapped delay filters for 0, 2 and 4 FB tapped delay filters. One can see from FIG. 2 that effectiveness of DFE improves with increasing the number of FF tapped delay filters up to 8 beyond which the improvement in performance saturates.

Similarly, FIG. 2 also shows that increasing the FB tapped delay filters beyond 2 does not bring any further improvement for a 10 GHz spaced system. The optimum number of tapped delay filters may depend upon the amount of ISI to be compensated, and therefore may depend upon the channel spacing (spectral efficiency) for which pre-filtering bandwidth is optimized. That is, the number of n feed forward (FF) and m feedback (FB) tapped delay filters 12 can be selected as a function of an amount of filtering applied by the filter 3 of the transmitter 4, which directly relates to the channel spacing that may be used by transmitter 4. Similarly, one can perform the same analysis with a 6.25 GHz spaced system and determine that acceptable performance can be achieved by using 8 FF and 4 FB tapped delay filters. For the 6.25 GHz spaced filter, for example, an optimized pre-filter bandwidth may be approximately 2.5 GHz.

Figure 3:
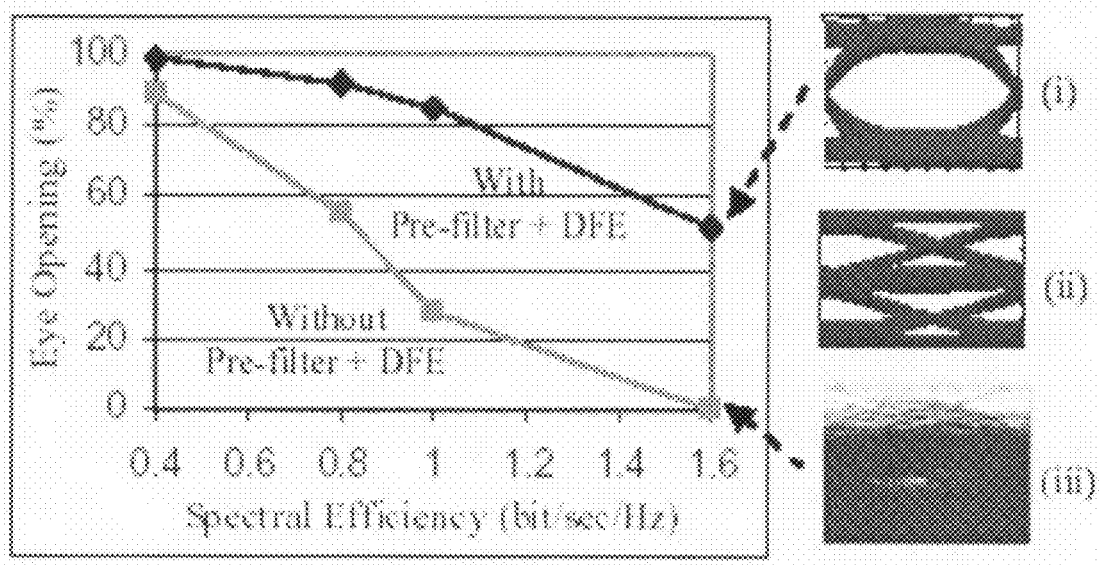
FIG. 3 is a graph showing eye opening vs. spectral efficiency with and without proposed scheme for a back to back 10.7 Gb/s WDM system. The eyes in the right hand side are (i) with pre-filtering+DFE, (ii) with pre-filtering but no DFE, and (iii) without pre-filtering and no DFE.

The back-to-back system performance can be analyzed by varying the spectral efficiency both with and without pre-filtering and DFE. Exemplary results of such an analysis are shown in FIG. 3 in which eye opening is plotted vs. spectral efficiency with and without pre-filtering and DFE. At lower spectral efficiency of 0.4 bit/sec/Hz (channel spacing=25 GHz), performance with the use of pre-filtering and DFE is only slightly better than a regular NRZ WDM system because the crosstalk is small at such a large channel spacing. However when the spectral efficiency is increased, the crosstalk increases due to reduced channel spacing and hence severely degrades the performance of regular NRZ WDM system. At high spectral efficiency the technique using pre-filtering and DFE improves the system performance significantly by almost completely eliminating the crosstalk using pre-filtering and efficiently compensating the resulting ISI using DFE. At the spectral efficiency of 1.6 bit/sec/Hz, the eye may be completely closed without using pre-filtering and DFE showing the system may not work with regular NRZ WDM scheme, whereas the pre-filtering and DFE may open the completely closed eye by more than 50%. Notably, a pre-filtered eye diagram without DFE at the spectral efficiency of 1.6 bit/sec/Hz is also shown in FIG. 3. The pre-filtered eye is also fully closed but not due to crosstalk but rather due to severe ISI induced by a narrow pre-filtering with the bandwidth of 2.5 GHz which is optimized for 6.25 GHz channel spacing. This ISI can be partially compensated using DFE and thereby opening the eye by more than 50%.

Figure 4:
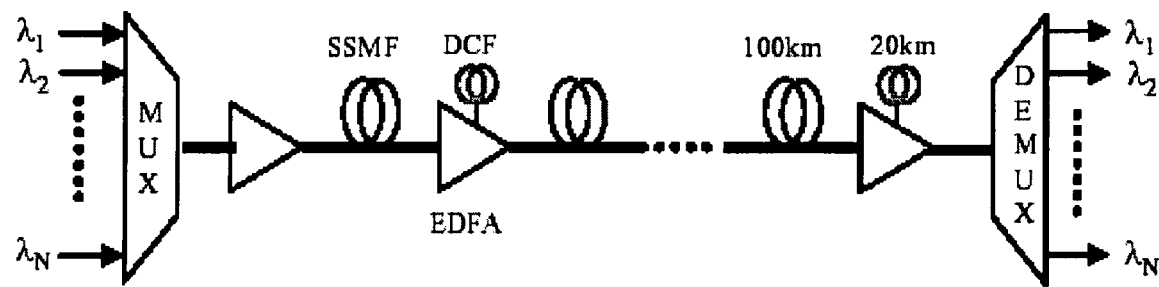
FIG. 4 is a block diagram showing a simulated fiber link employing a typical terrestrial dispersion map using standard single mode fiber and Erbium doped fiber amplifiers.

After back-to-back analysis, we analyzed the performance of the pre-filtering and DFE scheme by transmitting through a typical terrestrial dispersion map based upon SSMF shown in FIG. 4. The dispersion map consisted of 100 km spans of SSMF followed by a two stage EDFA having 20 km of dispersion compensating fiber (DCF) in between the two stages to compensate the dispersion of each span. The path average dispersion was assumed to be non-zero (−0.5 ps/nm-km per span) and was compensated using a fixed post-dispersion compensation at the receiver. The total span loss including the DCF is 35 dB and the noise figure of each EDFA was 6 dB. The dispersion values of SMF and DCF were 17 and −85 ps/nm-km, respectively. The effective areas of SMF and DCF were assumed to be 75 and 20 $\mu m^2$.

An independent pseudorandom bit stream of $2^{13}$ bits was transmitted on each of 11 channels through this dispersion map using pre-filtering at the transmitter and DFE at the receiver. Propagation of a wavelength multiplexed signal was simulated by solving nonlinear Schrodinger equation using split step Fourier scheme. The simulated nonlinear effects are self-phase modulation (SPM), cross-phase modulation (XPM) and four-wave mixing (FWM). In the first step we ignored the amplified stimulated emission (ASE) noise and carried out noiseless simulation to estimate the performance of pre-filtering and DFE in presence of fiber nonlinearity.

Figure 5:
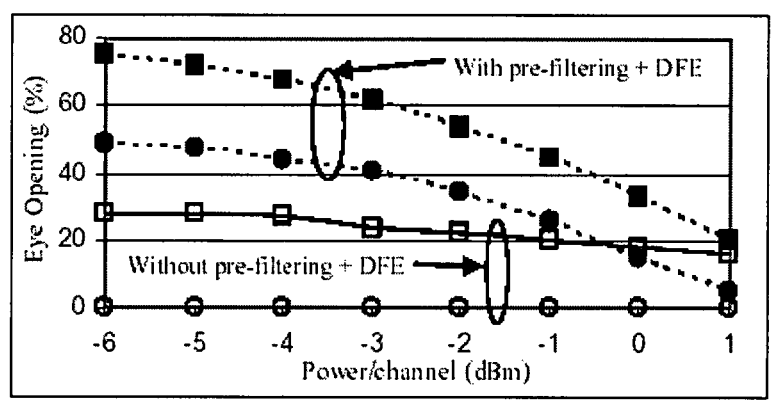
FIG. 5 is a graph showing eye opening vs. average channel power for spectral efficiencies of 1.6 bit/sec/Hz (circles) and 1.0 bit/sec/Hz (squares). Solid circles and squares represent the proposed scheme and hollow circles and squares represent the ordinary WDM system.

The resulting eye opening of the middle channel vs. average power/channel is shown in FIG. 5 for the transmission distance of 400 km with spectral efficiency of 1.6 bit/sec/Hz and for the transmission distance of 800 km with the spectral efficiency of 1 bit/sec/Hz. A total of 11 channels were simulated to ensure that XPM due to neighboring channels was properly included (5 significant neighboring channels on each side). We varied the number of simulated channels from 3 to 19 and found that the WDM nonlinear penalty due to XPM and FWM did not significantly increase when WDM channels are increased beyond 11. For comparison purpose, the eye opening as a result of no pre-filtering and no DFE is also shown in FIG. 5 for the corresponding distances and spectral efficiencies. We can see that the eye opening decreases with increasing channel power due to fiber nonlinearities but still performs significantly better than the case without pre-filtering and DFE. The spectral efficiency of 1.6 bit/sec/Hz, the eye was totally closed without using pre-filtering and DFE due to severe inter-channel crosstalk. Similarly, at the spectral efficiency of 1 bit/sec/Hz, the eye was less than 30% open without using the pre-filtering and DFE and was mainly degraded by crosstalk rather than nonlinearity. Therefore, eye opening decreases slowly with increasing channel power.

Figure 6:
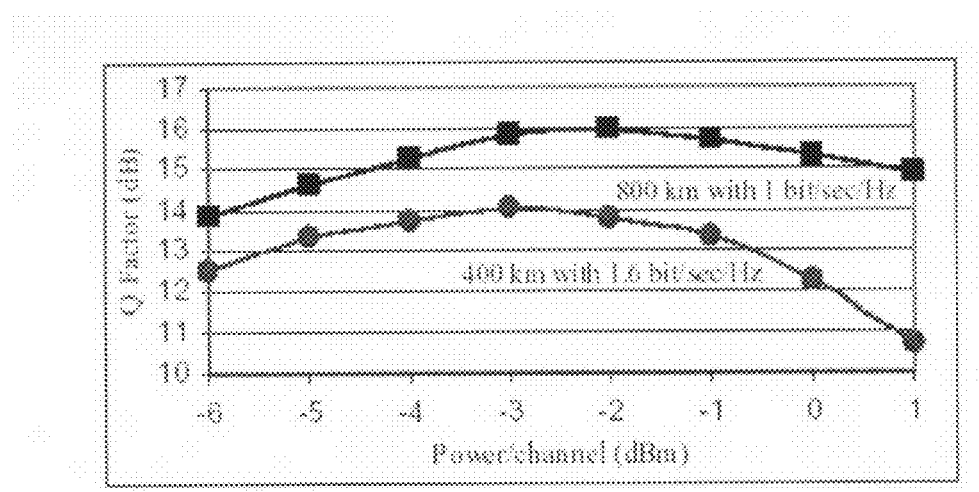
FIG. 6 is a graph showing Q Factor vs. average channel power for spectral efficiencies of 1.6 bit/sec/Hz with 400 km transmission distance and 1.0 bit/sec/Hz with 800 km transmission distance.

To estimate the bit error rate (BER) performance, we analyzed the above system by adding the accumulated noise at the receiver just before the photo-detection. We repeated the full receiver processing including DFE one hundred times by adding different optical noise each time. We then obtained the average and standard deviation of each bit just before the decision circuit in DFE. By assuming the Gaussian noise distribution, a BER was then calculated for each bit and then an average BER was obtained. The average BER was then converted to a Q factor. The resulting Q factors for the WDM systems with spectral efficiencies of 1.6 bit/sec/Hz (400 km system) and 1.0 bit/sec/Hz (800 km system) are shown in FIG. 6 vs. average channel power. The Q factor increases with increasing channel power due to better signal-to-noise ratio (SNR) and beyond a certain channel power, fiber nonlinearity increases too much and degrades the system performance. The optimal Q's of 14.1 and 16 dB are obtained respectively for the transmission distance of 400 km with 1.6 bit/sec/Hz spectral efficiency and 800 km with 1.0 bit/sec/Hz of spectral efficiency. We used an FEC overhead of 7% which will give an additional gain in Q of at least 5 dB. This suggests the feasibility of a 1.6 bit/sec/Hz of spectral efficiency for metropolitan distances using the pre-filtering and DFE technique.

Next, the performance of fractionally spaced DFE in improving spectral efficiency was compared to bit synchronous DFE. In bit synchronous DFE, both FF and FB tapped delay filters use a delay of one bit time (T). On the contrary, fractionally spaced DFE, FF tapped delays are only a fraction of one bit time while FB tapped delays are still one bit time. A delay of T/3 for FF tapped delay filters was used for fractionally spaced DFE. With fractionally spaced DFE, the number of FF tapped delay filters are increased by three times to include the same number of bits as in bit synchronous DFE. The performance of 400 km system with the spectral efficiency of 1.6 bit/sec/Hz was compared with 800 km system with the spectral efficiency of 1 bit/sec/Hz using bit synchronous and fractionally spaced DFE. The optimum performance of these two systems was 14.1 and 16 dB of Q at the optimum power levels of −3 and −2 dBm/channel, respectively for bit synchronous DFE case (FIG. 6).

Figure 7:
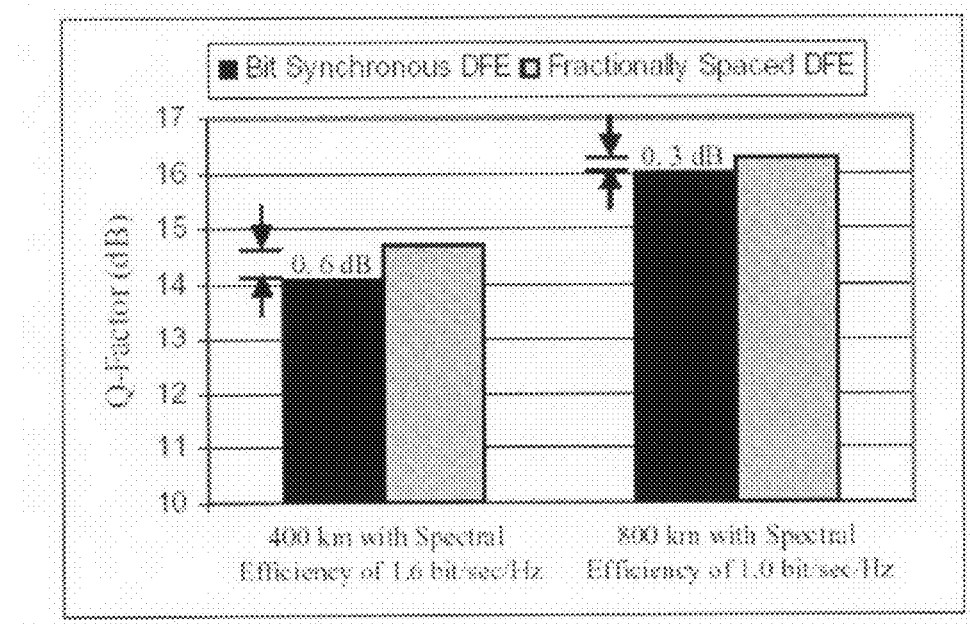
FIG. 7 is a graph showing a comparison of system Q for bit synchronous and fractionally spaced (FF tapped delay=T/3) DFE for 400 km system with spectral efficiency of 1.6 bit/sec/Hz and 800 km system with spectral efficiency of 1.0 bit/sec/Hz.

These systems were again simulated at these power levels with fractionally spaced DFE (FF tapped delay=T/3). The corresponding results are shown in FIG. 7 where the optimal Q values of bit synchronous and fractionally spaced DFE are plotted side by side. The Q improvement is 0.6 dB in 400 km system with spectral efficiency of 1.6 bit/sec/Hz, while a Q improvement of only 0.3 dB is obtained in 800 km system with spectral efficiency of 1 bit/sec/Hz. The improvement is slightly better in the case of spectral efficiency of 1.6 bit/sec/Hz because of more ISI due to stronger pre-filtering which is better compensated by fractionally spaced DFE.

Various embodiments of the invention have been described for utilizing electronic signal processing within an optical receiver to compensate ISI induced by strong pre-filtering of data at the optical transmitter to enhance the spectral efficiency of an optical communication system, such as a binary NRZ WDM system. In one embodiment, a 10.7 Gb/s WDM system employing pre-filtering at the transmitter and electronic signal processing at the receiver was analyzed using orthogonal polarization launch for alternate channel wavelengths. A transmission distance of up to 400 km was achievable with this exemplary embodiment with spectral efficiency of up to 1.6 bit/sec/Hz (channel spacing 6.25 GHz) on typical terrestrial dispersion maps employing standard single mode fiber (SSMF) and erbium doped fiber amplifiers (EDFAs). Channel spacing of 6.25 GHz for 10.7 Gb/s data rate is otherwise impossible in binary NRZ systems because of severe cross-talk.

The described techniques can be embodied in a variety of optical transmitters, receivers, and/or transceivers for optical communication systems or networks. The devices may include a general-purpose processor, embedded processor, digital signal processor (DSP), field programmable gate array (FPGA), application specific integrated circuit (ASIC) or similar hardware, firmware and/or software for implementing the techniques described herein. If implemented in software, a computer-readable storage medium may store computer readable instructions, i.e., program code, that can be executed by a processor or DSP to carry out one of more of the techniques described above. For example, the computer-readable storage medium may comprise random access memory (RAM), read-only memory (ROM), non-volatile random access memory (NVRAM), electrically erasable programmable read-only memory (EEPROM), flash memory, or the like. These and other embodiments are within the scope of the following claims.

The invention claimed is:

1. An optical communication system comprising:
   a transmitter having a filter that pre-filters each of a plurality of data channels to limit the bandwidth of each of said plurality of data channels and outputs an optical transmission which includes the pre-filtered data channels; and
   a receiver having an equalizer that applies digital equalization to the optical transmission, said digital equalization configured to compensate for the pre-filtering of the data channels at the transmitter.

2. The optical communication system of claim 1, wherein said filter cuts off high frequency components associated with said plurality of data channels to generate said pre-filtered data channels having a format that achieves a spectral efficiency that equals or exceeds 1 bit/sec/Hz.

3. The optical communication system of claim 1, wherein said transmitter further comprises a modulator and wherein the modulator applies a binary modulation format to each of the pre-filtered data channels.

4. The optical communication system of claim 3, wherein the modulator comprises a non-return to zero (NRZ) intensity modulator.

5. The optical communication system of claim 1, wherein the filter of the transmitter limits the frequency spreading of each of the data channels in the frequency domain and allows for reduced channel spacing within the optical transmission.

6. The optical communication system of claim 1, wherein the filter of the transmitter comprises an electrical low pass filter (LPF).

7. The optical communication system of claim 6, wherein the low pass filter comprises a Bessel shaped LPF of order 10.

8. The optical communication system of claim 1, wherein the digital equalizer comprises a digital feedback equalizer (DFE).

9. The optical communication system of claim 8, wherein the DFE electronically compensates for inter-symbol interference (ISI) induced by the pre-filter at the transmitter.

10. The optical communication system of claim 8, wherein the DFE of the receiver contains n feed forward (FF) and m feedback (FB) tapped delay filters.

11. The optical communication system of claim 10, wherein n and m are a function of an amount of filtering applied by the filter of the transmitter.

12. The optical communication system of claim 10, wherein n and m are a function of a channel spacing used by the transmitter for the data channels when outputting the optical transmission.

13. The optical communication system of claim 10, wherein the DFE of the receiver contains no more than 8 FF and no more than 2 FB tapped delay filters.

14. The optical communication system of claim 1, wherein the equalizer of the receiver compensates for distortion in the signal that was intentionally introduced at the transmitter.

15. The optical communication system of claim 1, wherein coefficients of the equalizer are determined as a function of an amount of distortion intentionally introduced within the data channels by the filter of the transmitter.

16. The optical communication system of claim 1, wherein coefficients of the equalizer are adaptively computed to minimize error within the optical transmission.

17. The optical communication system of claim 1, wherein the equalizer of the receiver outputs a stream of detected bits from the equalized optical transmission.

18. The optical communication system of claim 1, wherein the equalizer comprises a Maximum Sequence Likelihood Estimation (MSLE) equalizer or a Viterbi Decoder.

19. A method comprising:
   pre-filtering, at an optical transmitter, each of a plurality of data channels to limit a bandwidth for each of the data channels;
   outputting the pre-filtered data channels from the optical transmitter in the form of an optical transmission; and
   applying digital equalization to the optical transmission at an optical receiver to compensate for the pre-filtering of the data channels at the transmitter.

20. The method of claim 19, wherein pre-filtering comprises filtering the plurality of data channels into a format that achieves a spectral efficiency that equals or exceeds 1 bit/sec/Hz.

21. The method of claim 20, further comprises modulating the pre-filtered data channels by applying a binary modulation format to each of the pre-filtered data channels.

22. The method of claim 19, wherein pre-filtering comprises applying a low pass filter to limit frequency spreading of each of the data channels so as to allow for reduced channel spacing within the optical transmission.

23. The method of claim 19, wherein applying digital equalization comprises applying digital feedback equalization (DFE) at the receiver to electronically compensate for inter-symbol interference (ISI) induced by the pre-filtering of the data channels at the transmitter.

24. The method of claim 23, further comprising selecting a number n of feed forward (FF) and a number m of feedback (FB) tapped delay filters of a digital feedback equalizer of the receiver as a function of an amount of the pre-filtering to the data channels at the transmitter.

25. The method of claim 23, further comprising selecting a number n of feed forward (FF) and a number m of feedback (FB) tapped delay filters of a digital feedback equalizer of the receiver as a function of a channel spacing used by the transmitter for the data channels when outputting the optical transmission.

26. The method of claim 23, further comprising selecting coefficients of a digital feedback equalizer of the receiver as a function of an amount of distortion intentionally introduced within the data channels by the filtering of the transmitter.

27. A computer-readable medium comprising instructions for causing a programmable processor to perform a method of claim 19.

28. An optical transmitter that pre-filters each of a plurality of data channels prior to modulation of the data channels to limit a bandwidth of each of said plurality of data channels and output of an optical transmission, wherein application of digital feedback equalization to the optical transmission compensates for the pre-filtering of the data channels and allows bit detection.

29. The method of claim 19, wherein applying digital equalization comprises applying Maximum Sequence Likelihood Estimation (MSLE) or a Viterbi Decoding.

30. An optical receiver comprising:
   a photo detector to receive an optical transmission where each of a plurality of data channels prior of the transmission have been pre-filtered to limit a bandwidth of the data channels; and
   a digital feedback equalizer (DFE) that applies digital feedback equalization to the optical transmission to compensate for the pre-filtering of the data channels at the transmitter.

* * * * *